Aug. 10, 1971     J. E. LAMBERT     3,598,700
FUEL LATCH DESIGN

Filed Aug. 21, 1968     2 Sheets-Sheet 1

INVENTOR
JAMES E. LAMBERT
By J. R. Hughes
AGENT

United States Patent Office 3,598,700
Patented Aug. 10, 1971

3,598,700
FUEL LATCH DESIGN
James E. Lambert, Port Hope, Ontario, Canada, assignor to Atomic Energy of Canada Limited, Ottawa, Ontario, Canada
Filed Aug. 21, 1968, Ser. No. 754,296
Int. Cl. G21c 3/32
U.S. Cl. 176—76
3 Claims

ABSTRACT OF THE DISCLOSURE

A latch for interconnecting, in serially disposed relation, fuel bundles for nuclear power reactors. The latch has a thin bowed profile and is more or less a continuous ring. As such, it has a low neutron capture ratio; readily interlocks and disconnects with adjacent latches; and, axially displaces some of the fuel elements in each bundle to present a more uniform or consistent radiation density across interconnecting latches.

---

This invention relates to a latch and in particular to a fuel latch for interlocking, in serially disposed relation, fuel bundles for nuclear power reactor.

In nuclear power reactors it is preferred that fuel elements which contain fissionable material be of small size and length, to facilitate handling and manufacture. It is common, however, to place a plurality of fuel elements 7–37 into a bundle, the bundle to be disposed within cooling tubes of the reactor. Latches are sometimes provided at the end of each bundle to "lock-in" the bundles in a serially disposed relation when the bundles are in the pressure tube. This facilitates readily removal of spent fuel bundles.

In order to facilitate handling, it is preferred that the latches "lock-in" to each other such that a pull or push on a single bundle will move the whole series of interlocked bundles. It is also preferred that the latch have a low neutron capture.

The invention achieves an interlocking latch for fuel bundles which has a low neutron capture by virtue of its thin bowed profile. The bowed profile offers the opportunity to axially displace some of the fuel elements in a bundle from others, enhancing the consistency or continuity of the radiation density across interconnecting latches. Further, the latch, being more or less a continuous ring, circumferential stresses, caused by bundles being loaded axially under tension, enhance the strength of the latch.

The invention therefore contemplates a fuel latch comprising an annular member having a flat bearing surface adapted for abutting relation with a similar latch, said member having at least two diametrically opposite groove defining flange portions, one portion a radially outwardly disposed groove, the other portion defining a radially inwardly disposed groove, said portions laterally positioned on opposite sides of said bearing surface such that a similar latch, with its bearing surface in registry with that of said latch is nested in the grooves of said latch whereby the latches are restrained from axial separation.

The invention also contemplates that the flange portions be semi-circular and that there be means on said annular member for securing fuel elements thereto.

The embodiments of the invention will now be described by way of example, reference being had to the accompanying drawings in which.

Figure 1:
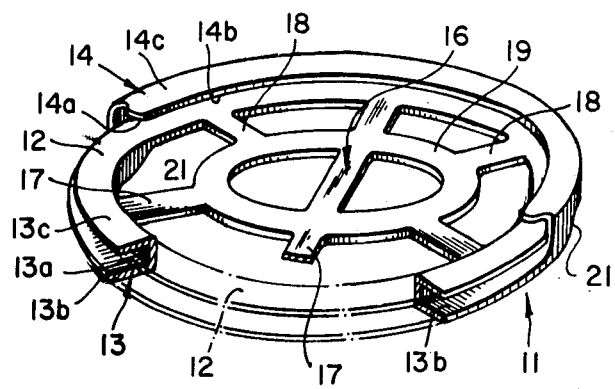
FIG. 1 is a perspective of a preferred embodiment of said latch.

Referring to FIG. 1 a latch 11 is annular and has a flat bearing surface 12 against which an identical flat bearing surface of a similar latch (see FIG. 4) may abut. The annular member has two semi-circular flange portions 13 and 14, the flange portion 13 defining a semi-circular groove 13a radially opening outwards and the flange portion 14 defining a semi-circular groove 14a radially opening inwards. Said flange portions 13 and 14 with grooves 13a and 14a are laterally disposed on the opposite sides of said bearing surface 12. To increase strength and enable a strong joint to be made between 13b or 14b and the fuel element lower arms 13b and 14b of the flange portions 13 and 14 are radially extended a greater distance than the respective upper arms 13c and 14c. However, if preferred, each of the arms 13b, 13c, 14b, 14c, could be of equal length. In any event the upper co-linear surfaces of the upper arm 13c and of the lower arm 14b form the bearing surface 12. To complete the latch 11, and to add rigidity thereto, an inner strut network 16, which includes radial members 17 and 18 and an inner annular element 19, is provided.

Figure 2:
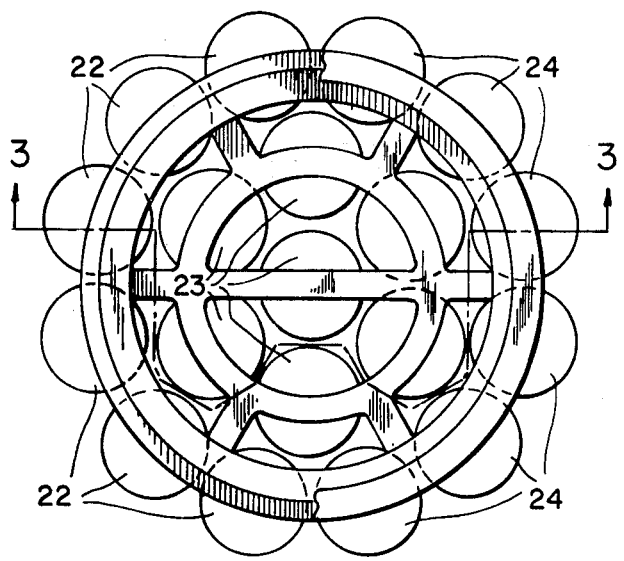
FIG. 2 is a plan view of said latch showing fuel elements secured thereto.
Figure 3:
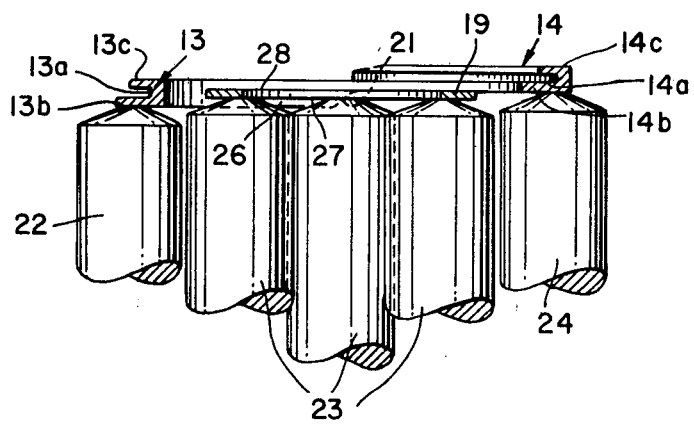
FIG. 3 is a cross-section through 3—3 of FIG. 2.

Referring to FIGS. 1, 2 and 3 the latch 12 has two back tapering portions 21 diametrically opposite, which close off the groove 13a to its semi-circular configuration. These back tapering portions 21 are provided to reduce the profile of the latch, subjacent to the bearing surface 12 beneath inward flange portion 14. This reduction of profile, among other things, reduces the neutron capture by the latch. As will be appreciated on careful examination radial members 17 interconnect flange portion 13 and annular element 19, while radial members 18 interconnect flange portion 14 and annular element 19. The radial members 18 are accordingly curved slightly such that the plane of the annular member 19 is parallel to that of the bearing surface 12 but disposed between those of lower arms 13b and 14b. Accordingly, identical fuel elements 22, 23 and 24 have ends secured, as by welding, on the underside of arm 13b, on annular element 19 and on the underside of arm 14b such that the ends of the elements 22, 23 and 24 successively terminate in axially disposed planes, 26, 27 and 28 (see FIG. 3), which tends to present, across interconnecting latches, for example 11′ and 11″ (FIG. 4), a more uniform or consistent radiation density.

Figure 4A:
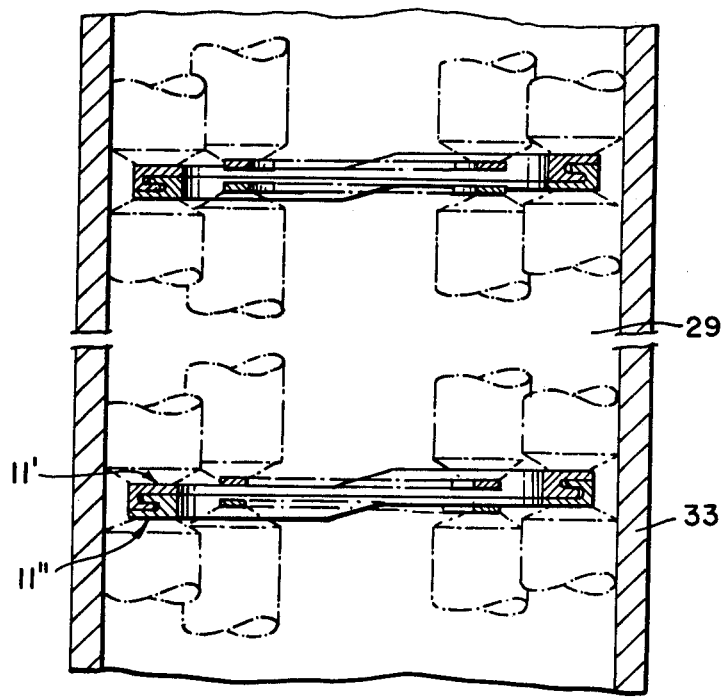
FIG. 4 is a cross-section of a cooling tube of a nuclear reactor, partially broken to show two modes of utilizing the embodiments of the invention.
Figure 4B:
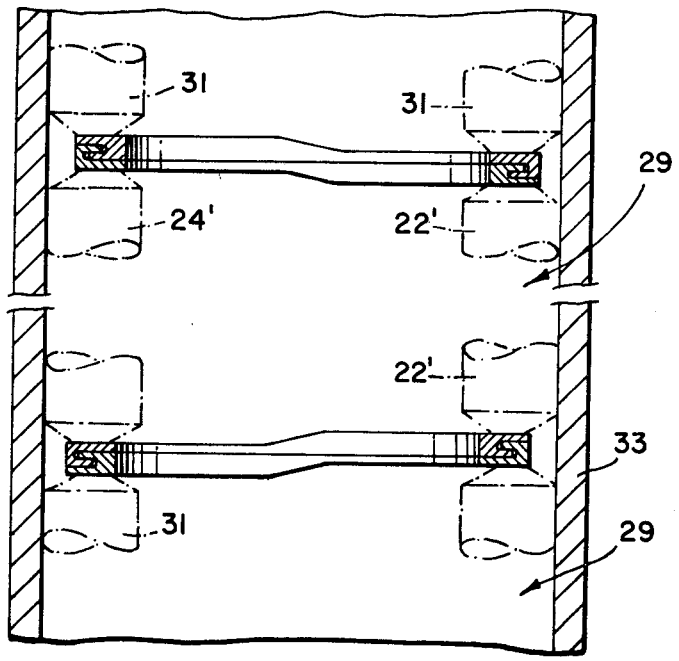

Referring to FIG. 4a, a fuel bundle 29 is composed of two latches 11 at each end, and fuel elements 31 identical to those of elements 22, 23 and 24. The fuel bundle 29 has both of its latches 11 disposed in the same direction (FIG. 4a). Alternatively, a fuel bundle 30 may have latches 11 disposed in opposite directions (FIG. 4b). In this configuration, the fuel elements must be of three different sizes, 21′, 23′ and 24′ in order to accommodate the varying dimensions between the latches. In either configuration, the latches 11 interlock with adjacent latches.

Because of the close tolerances between the inner wall of the pressure tubes 33 and the outer fuel elements, the fuel bundles are restrained from lateral movement. As a result, the latches are held in engagement and due to the "tongue and groove" relationship between flange portion 14 of one latch 11′ and the groove 13a of the adjacently abutting latch 11″, the fuel bundles 29 and 30 are locked in end-to-end engagement. Any lateral pull or push will move all other bundles in the pressure tube. Any pull generates circumferential stress about the parimeter of the latch and hence enhances its strength.

I claim:

1. A latch for serially interlocking nuclear fuel bundles comprising an annular member, a first radially inwardly projecting flange portion extending circumferentially in spaced relation from one side of said annular member, a second radially outwardly projecting flange portion extending circumferentially in spaced relation from the other side of said annular member and disposed substantially diametrically opposite to said first flange member whereby said first and second flange portions define first and second grooves with said annular member for receiving in interlocking relationship the second and first flange portions respectively of a similar inverted latch, and a strut network disposed within and connected with said annular member in substantially the same plane, one side of said annular member having a bearing surface for abutting the bearing surface of a similar inverted latch, and the other side of said annular member and said strut network providing support means for attaching thereto fuel bundles.

2. The latch of claim 1 wherein said strut network comprises an annular element conected to said annular member by interconnecting radial members.

3. The latch of claim 1 wherein each of said first and second flange members extend substantially over one half the circumference of said annular member.

References Cited

UNITED STATES PATENTS

| | | | |
|---|---|---|---|
| 2,660,029 | 11/1953 | Geyer | 176—36 |
| 2,707,867 | 5/1955 | Ruhl | 176—36 |
| 3,238,109 | 3/1966 | Kent et al. | 176—78 |
| 3,266,997 | 9/1966 | Hooper et al. | 176—77X |
| 3,345,267 | 10/1967 | Nazzer et al. | 176—78 |
| 3,321,378 | 5/1967 | Thomson | 176—76X |

BENJAMIN R. PADGETT, Primary Examiner

G. G. SOLYST, Assistant Examiner

U.S. Cl. X.R.

176—30, 78, 81